United States Patent [19]

Guerra et al.

[11] Patent Number: 6,099,269
[45] Date of Patent: Aug. 8, 2000

[54] ABSORPTION REFRIGERATION SYSTEM HAVING A DIAPHRAGM PUMP AND A HYDRAULIC PISTON PUMP

[75] Inventors: Marco Guerra, Milan; Benito Guerra, Bergamo, both of Italy

[73] Assignee: Fin Robur, Evansville, Ind.

[21] Appl. No.: 08/944,350

[22] Filed: Oct. 6, 1997

[51] Int. Cl.[7] ................................................. F04B 17/05
[52] U.S. Cl. ........................ 417/392; 417/307; 417/385; 417/440
[58] Field of Search ................................. 417/392, 307, 417/440, 385, 545, 525, 549, 395, 53

[56] References Cited

U.S. PATENT DOCUMENTS

| | | | |
|---|---|---|---|
| 1,347,082 | 7/1920 | Davis | 417/545 |
| 2,968,255 | 1/1961 | Loeber | 417/545 |
| 3,204,858 | 9/1965 | Dros | 417/385 |
| 3,256,824 | 6/1966 | Sebardt | 417/385 |
| 3,286,640 | 11/1966 | Bauer | 417/385 |
| 4,118,152 | 10/1978 | Bron | 417/254 |
| 4,743,169 | 5/1988 | Funakawa et al. | 417/306 |
| 4,828,464 | 5/1989 | Maier et al. | 417/388 |
| 5,106,274 | 4/1992 | Holtzapple | 417/388 |
| 5,165,869 | 11/1992 | Reynolds | 417/385 |
| 5,201,641 | 4/1993 | Richer | 417/417 |
| 5,249,932 | 10/1993 | Bork | 417/386 |
| 5,387,090 | 2/1995 | Becker | 417/203 |
| 5,492,449 | 2/1996 | Hunklinger et al. | 417/259 |
| 5,499,909 | 3/1996 | Yamada et al. | 417/384 |
| 5,518,375 | 5/1996 | Vandromme et al. | 417/413.1 |
| 5,554,014 | 9/1996 | Becker | 417/413.1 |
| 5,588,811 | 12/1996 | Price | 417/350 |

*Primary Examiner*—Charles G. Freay
*Assistant Examiner*—Robert Z. Evora
*Attorney, Agent, or Firm*—Woodard, Emhardt, Naughton, Moriarty & McNett

[57] ABSTRACT

A device for pumping an absorbent solution from the low pressure side of an absorption heat exchange system to the high pressure side of that system without relying on pressure from the low pressure side. The device preferably includes a diaphragm pump disposed in an absorbent fluid pathway to pull absorbent solution from the low pressure side and to push absorbent solution into the high pressure side. The diaphragm of the diaphragm pump is powered by a piston-driven hydraulic pump which pushes and pulls oil into and out of the diaphragm pump. The hydraulic pump preferably has sufficient power to pull absorbent solution from the low pressure side of the heat exchange system without relying on any pressure from the low side. Check valves are used to permit the one-way flow of absorbent solution from the low pressure side to the high pressure side of the system.

5 Claims, 4 Drawing Sheets

ABSORPTION REFRIGERATION SYSTEM HAVING A DIAPHRAGM PUMP AND A HYDRAULIC PISTON PUMP

FIELD OF THE INVENTION

The present invention relates generally to pumps used in absorption heat exchange systems, and more particularly to a pump that transfers liquid absorbent/refrigerant from the low pressure side to the high pressure side of such a system.

BACKGROUND TO THE INVENTION

Absorption refrigeration systems are well known to the art. The basic principle of these systems is identical to that of the single-stage compression system except for the manner in which the pressure of the refrigerant vapor is increased to the level required for condensation. In an absorption system, the compressor of a compression system is replaced by an "absorber" and a "generator." Then, instead of compressing a low-pressure refrigerant vapor, the refrigerant vapor is first absorbed by a weak solution of refrigerant and is then pumped into a generator where it is heated back to the vapor phase.

Further describing an absorption system, a generator heats an absorbent solution, preferably ammonia and water, so as to release the refrigerant (ammonia) in vapor form, from solution in the generator as previously described. The refrigerant vapor then passes through an analyzer to a rectifier and then to a condenser where it is condensed at a relatively high pressure by the ambient air or by fluids such as water or water/glycol mixtures. The condensed ammonia passes through a pressure reduction device and a refrigerant heat exchanger to an evaporator where the pressure is further reduced and the refrigerating effect is accomplished. The low pressure vapor then flows back through the refrigerant heat exchanger to a solution absorber heat exchanger where it comes into contact with a weak solution of refrigerant fluid flowing from the generator. In the absorber heat exchanger, the weak solution absorbs a portion of the low pressure vapor with the resulting solution passing into an absorber cooled by ambient air or by fluids such as water or water/glycol mixtures. This results in the remaining ammonia vapor being absorbed in the absorbent solution. The strong solution thus formed passes through a solution pump, to help overcome the difference between the low pressure and the high pressure sides of the system, to the rectifier, the absorber heat exchanger, and the generator, where the cycle repeats itself. The present invention addresses a new design hydraulic pump whose function is to pump the absorbent solution from the low pressure side to the high pressure side of the system.

As further background, some prior art systems have used diaphragm pumps to transfer the absorbent solution from the low pressure side to the high pressure side of the system. These prior art diaphragm pumps are driven by a hydraulic fluid that is pulsed against a diaphragm to push absorbent solution to the high side. When the hydraulic fluid pressure is released, the pressure from the low side of the system pushes new absorbent solution against the diaphragm, causing it to return to its original position.

Unfortunately, the operating capabilities of prior art hydraulic pumps are limited by the fact that when the entering pump pressure is below approximately 10 psig (25 psia), the pump bypasses most of the oil normally used for pulsing the diaphragm within the pump mechanism itself through a relief valve. This causes the pump to operate inefficiently, and may even cause the pump to seize up and stop.

More particularly, as the absorber pressure decreases, the movement of the diaphragm from its upper position (pushing refrigerant solution into the high pressure side of the system) to its lower position ("pulling" refrigerant solution from the low pressure side of the system) is also decreased. Therefore, the pump merely moves oil in its own enclosure. The oil gets very hot and can cause the pump to malfunction. From the unit's operating parameters, the 25 psia at the pump equates to approximately a 5° F. at the evaporator at its lowest temperature.

A need therefore exists for a solution pump that can pump absorbent solution from the low side to the high side of an absorption refrigeration system even when the pressure on the low side is extremely low. The present invention addresses that need.

SUMMARY OF THE INVENTION

Briefly describing the present invention there is provided a device for pumping an absorbent solution from the low pressure side of an absorption heat exchange system to the high pressure side of that system without relying on pressure from the low pressure side. The device preferably includes a diaphragm pump disposed in an absorbent fluid pathway to pull absorbent solution from the low pressure side and to push absorbent solution into the high pressure side. The diaphragm of the diaphragm pump is powered by a piston-driven hydraulic pump which pushes and pulls oil into and out of the diaphragm pump. The hydraulic pump preferably has sufficient power to pull absorbent solution from the low pressure side of the heat exchange system without relying on any pressure from the low side. Check valves are used to permit the one-way flow of absorbent solution from the low pressure side to the high pressure side of the system.

A method of pumping an absorbent solution from the low pressure side of an absorption heat exchange system to the high pressure side of an absorption heat exchange system is also disclosed. The method comprises using a piston-driven hydraulic pump to push oil into a diaphragm pump and to pull oil out of that same diaphragm pump, and thereby to reciprocally move a diaphragm to transfer absorbent solution from the low pressure side to the high pressure side of the system.

One object of the present invention is to provide a pump that will transfer absorbent solution from the low pressure side to the high pressure side of an absorption refrigeration system without relying on significant pressure from the low side.

Further objects and advantages of the present invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the preferred embodiments, and such further applications of the principles of the invention as described herein being contemplated as would normally occur to one skilled in the art to which the invention pertains.

Figure 1B:
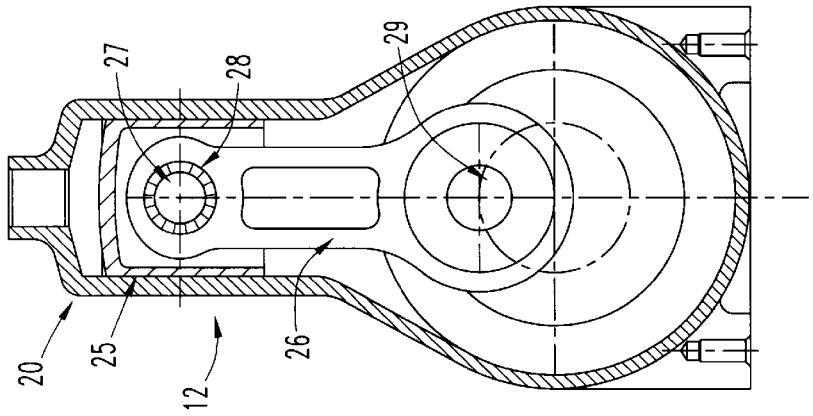
FIGS. 1A and 1B show the device of the present invention, according to one preferred embodiment.
Figure 1A:
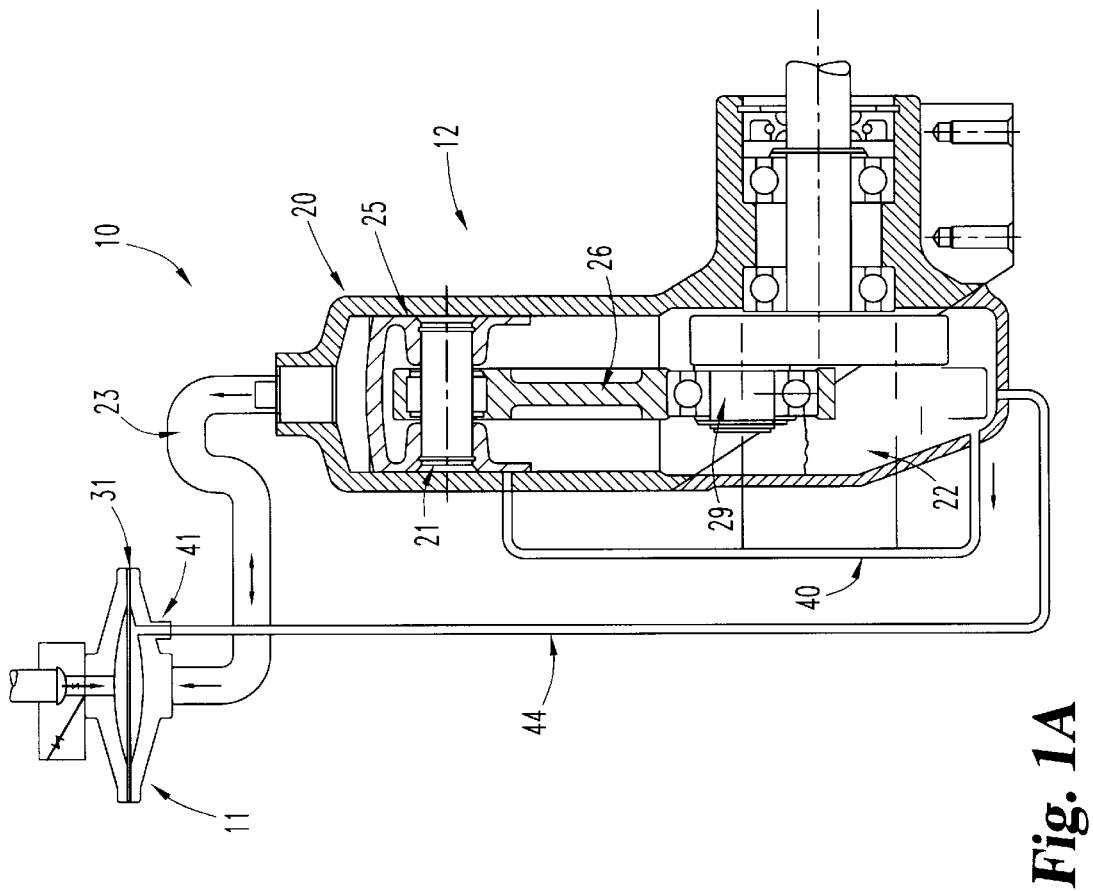
Figure 2A:
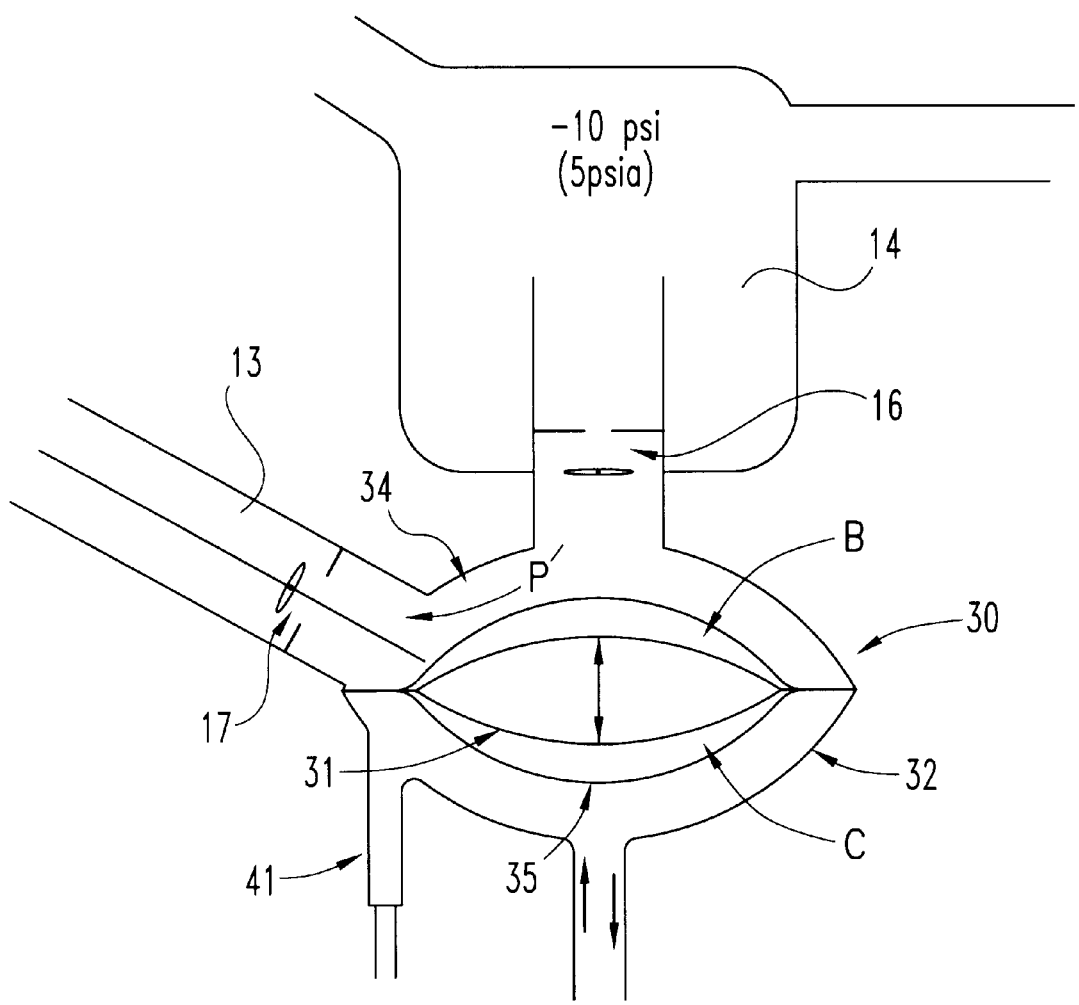
FIG. 2A shows the diaphragm pump portion of the device of the present invention, according to one preferred embodiment.
Figure 3:
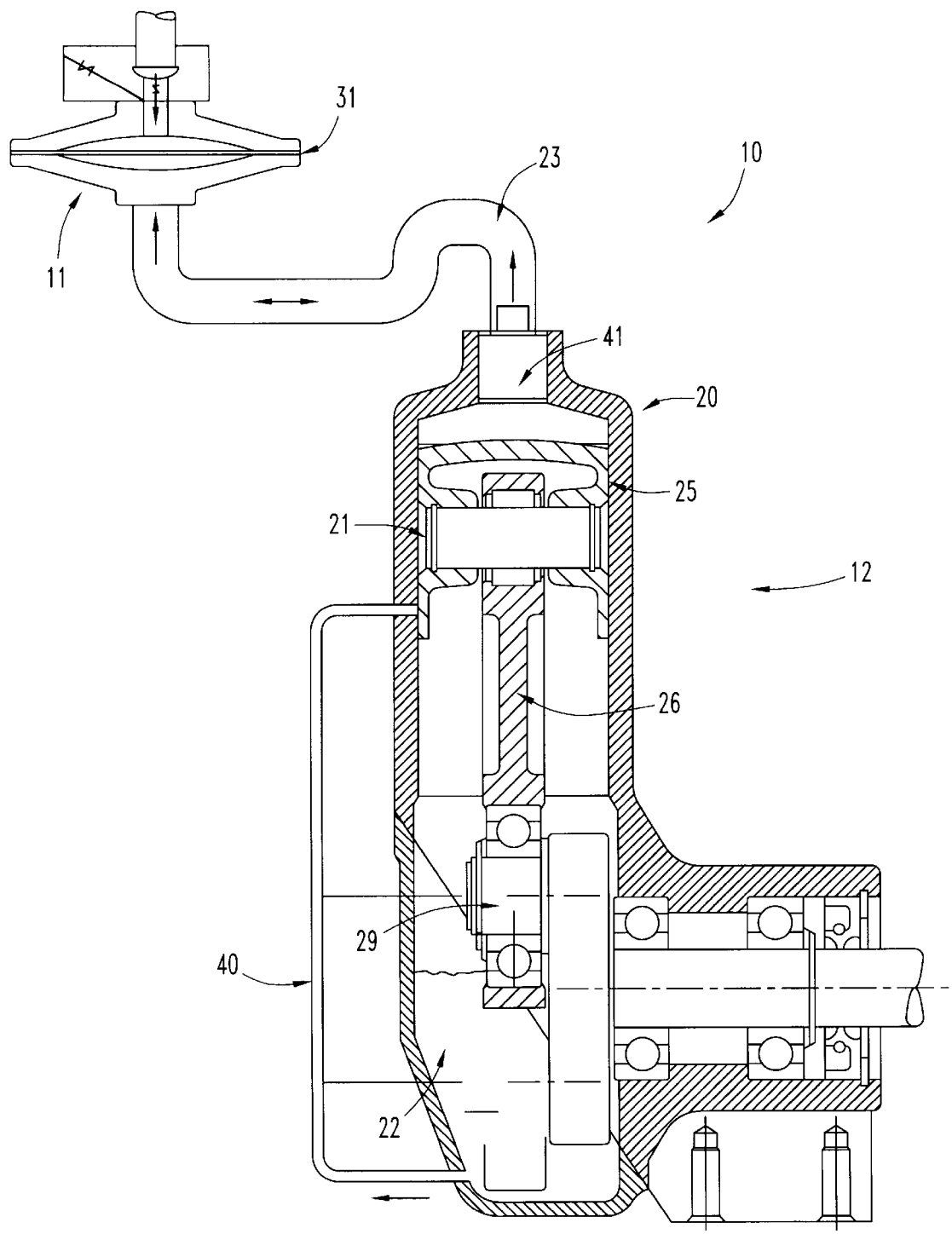
FIG. 3 shows the piston driven hydraulic pump portion of the device of the present invention, according to one preferred embodiment.

Referring first to the drawings, FIGS. 1A, 1B and 2A all show the device of the present invention, according to one preferred embodiment. FIG. 3 shows the device of the present invention according to a second preferred embodiment. In all of the figures, device 10 includes a diaphragm pump 11 and a hydraulic pump 12, with diaphragm pump 11 being disposed in an absorbent fluid pathway "P" of an absorption refrigeration system so as to be positioned to transfer absorbent solution from the low pressure side 14 to the high pressure side 15 of the system. As will be explained further below, a first check valve 16 is provided in fluid pathway P to permit the one-way flow of absorbent solution from the low pressure side of the system, and a second check valve 17 is provided in fluid pathway P to permit the one-way flow of absorbent solution into the high pressure side of the system.

Piston-driven hydraulic pump 12 preferably comprises a hydraulic pump body 20 defining a cylinder portion 21 and an oil reservoir portion 22, with cylinder portion 21 being in fluid communication, preferably through main oil line 23, with diaphragm pump 11. Oil reservoir portion 22 is substantially closed so as to retain oil, and a reservoir of oil is disposed in that portion.

A piston 25 is disposed in cylinder portion 21 of pump body 20 to pull and push oil into and out of diaphragm pump 11 through main oil line 23, and into and out of oil reservoir 22 through make up oil line 40. In certain preferred embodiments, piston 25 is reciprocally moved by connecting rod 26 connected to a cam. In the most preferred embodiments connecting rod 26 is connected to piston 25 with a pin 27 and roller bearing 28 arrangement.

Diaphragm pump 11 includes a diaphragm chamber 30 and a diaphragm 31. Diaphragm chamber 30 preferably is made of a body 32, with at least one orifice 33 for receiving fluid through check valve 16 from the low pressure side of the system, and for passing fluid through check valve 17 into the high pressure side of the system. A second orifice 35 is preferably used for transferring oil between the diaphragm chamber and piston-driven hydraulic pump 20.

Diaphragm 31 is disposed in diaphragm chamber 30 to sealingly separate the diaphragm chamber into a first portion including said orifice(s) for transferring solution from the low pressure side to the high pressure side, and said second orifice, and a second portion including said orifice to transfer oil from diaphragm chamber 30 to hydraulic pump 20. With that structure, oil and absorbent fluid are kept separate and do not mix.

A make up oil line 40 is preferably provided in hydraulic pump 12 to allow oil to pass between oil reservoir 22 and cylinder portion 21 of the pump when piston 25 is in the lower position. In the preferred embodiments, make up oil line 40 enters cylinder 21 slightly above the bottom of piston 25 when the piston is raised to its uppermost position. In another preferred embodiment, make up oil line 40 is provided internally within the hydraulic pump body.

An overpressure relief valve 41 is also preferably included to allow oil to flow from diaphragm pump 11 to hydraulic pump 12 in response to a predetermined oil pressure in the diaphragm pump. In some embodiments the overpressure relief valve 41 is provided in an overpressure return line 44 as shown in FIG. 1. In other preferred embodiments overpressure relief valve 41 is provided at the top of piston 25 so that overpressure oil is returned back through a bore in the piston itself. In that embodiment piston 25 includes a piston head with a bore or hole therein to provide a passageway between the upper surface of the piston and the cylinder below.

Figure 2B:
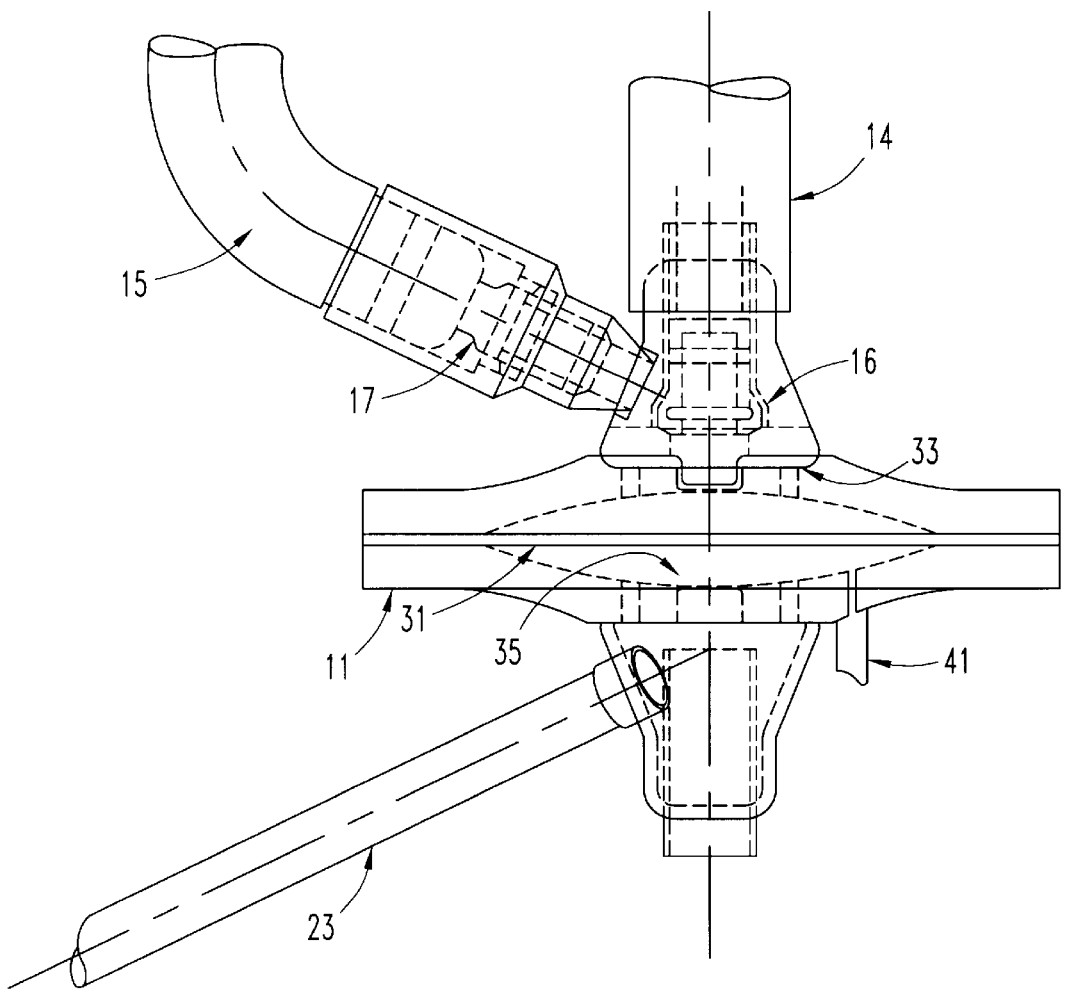
FIG. 2B shows the diaphragm pump portion of the device of the present invention, according to a second preferred embodiment.

It is to be appreciated from the above that fluid pathway P is defined herein as existing wherever absorbent solution flows as it passes from the low side and the high side of the system. Thus, in some embodiments, such as shown in FIG. 2A, fluid pathway P includes a short passageway 34 connecting the low pressure side to the high pressure side. In other preferred embodiments, such as shown in FIG. 2B, no additional conduit is used. In either type of embodiment, and in others, either a single orifice or a multiple orifice system may be used to connect the absorption system components to the diaphragm chamber.

In operation, a cam 29 moves connecting rod 26 upward to push piston 25 upward on its pressure stroke. As piston 25 moves upward, oil which was in cylinder 21 is pushed into make up oil line 40 and into main oil line 23. The oil in make up oil line 40 is returned to oil reservoir 22, while the oil in main oil line 23 is pushed into diaphragm pump 11.

The oil entering diaphragm pump 11 pushes diaphragm 31 upward to position "B", thereby causing any absorbent solution in diaphragm chamber 30 to be pushed into the high pressure side 15 of the system. Check valve 16 prevents solution from flowing back into the low pressure side of the system, while check valve 17 allows solution to flow into the high pressure side. If the pressure in diaphragm chamber 30 becomes too great (above a predetermined pressure), overpressure relief valve 41 directs oil back to oil reservoir 22 as noted above.

After piston 25 has completed a pressure stroke it starts to move downward, causing oil to be pulled back from the underside of the diaphragm. This movement pulls the diaphragm down, even without relying on pressure from the low side of the system. As the diaphragm moves downward, absorbent solution is pulled or drops from the low pressure side 14 of the system into diaphragm chamber 30, even when saturated, where it is ready to be transferred to the high side on the next stroke. With this arrangement it is possible to cause the diaphragm to move to a position that is the equivalent of working against a low side pressure of negative 10 psi. This equates to an approximate −40° F. evaporator, and is beneficial when working with low temperature requirements in a system.

In the most preferred embodiments the top of piston 25 goes below the opening to make up oil line 40 when the piston is near the bottom of its downward stroke. When this happens, oil is also pulled from oil reservoir 22 into cylinder 21 to provide an appropriate amount of oil in cylinder 21.

When the piston reaches the bottom of its "pulling" stroke it reverses direction and again begins to push oil into diaphragm chamber 30. As described above, this pushes diaphragm 31 upward, transferring solution from diaphragm chamber 30 into the high pressure side 15 of the system. The cycle repeats itself as long as piston 25 is powered, pulling solution from the low side and pushing solution into the high side without relying on any significant pressure from the low side to move diaphragm 31 back down.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected. For example, it is to be appreciated that piston 25 can be chamfered to assist in controlling the amount of oil that is directed into and out of make up oil line 40. Or, oil make up line 40 can be adjusted as to where it enters cylinder 21 to provide an alternate method of controlling oil flow. The higher the entry point of oil make up line 40, the more oil is returned through oil make up line 40, and the less oil is pulsed against diaphragm 31.

What is claimed is:

1. A device for pumping an absorbent solution from the low pressure side of an absorption heat exchange system to the high pressure side of an absorption heat exchange system without relying on pressure from the low pressure side of the system, wherein said heat exchange system includes an absorbent fluid pathway between the low pressure side and the high pressure side; said device comprising:
    (a) a diaphragm pump disposed in the absorbent fluid pathway of an absorption heat exchange system to pull absorbent solution from the low pressure side of said absorption heat exchange system and subsequently to push said absorbent solution into the high pressure side of said absorption heat exchange system;
    (b) a piston-driven hydraulic pump to push oil into said diaphragm pump and pull oil out of said diaphragm pump, and thereby to reciprocally move a diaphragm in said diaphragm pump, and thereby to cause said diaphragm pump to pull absorbent solution from the low pressure side of the heat exchange system and subsequently to push said absorbent solution to the high pressure side of the heat exchange system;
    (c) a first check valve to permit the one-way flow of absorbent solution from the low pressure side of the heat exchange system; and
    (d) a second check valve to permit the one-way flow of absorbent solution into the high pressure side of the heat exchange system; and
    (e) an overpressure relief valve to allow oil to flow from the diaphragm pump to the hydraulic pump in response to a predetermined oil pressure in said diaphragm pump wherein said diaphragm pump comprises:
        (a)(i) a diaphragm chamber disposed in said absorbent fluid pathway; the diaphragm chamber having at least one orifice for receiving fluid through said first check valve from the low pressure side of the system and for passing fluid through said second check valve into the high pressure side of the system, and at least one orifice for transferring oil between said diaphragm chamber and said piston-driven hydraulic pump; and
        (a)(ii) a diaphragm disposed in said diaphragm chamber to sealingly separate the diaphragm chamber into a first portion including said orifice for receiving fluid from the low pressure and for passing fluid into the high pressure side, and a second portion including said orifice for transferring oil between said diaphragm chamber and said piston-driven hydraulic pump; and
    wherein said piston-driven hydraulic pump comprises:
        (b)(i) a hydraulic pump body defining a cylinder portion and an oil reservoir portion, said cylinder portion being in fluid communication with said diaphragm pump, and said oil reservoir portion being substantially closed so as to retain oil;
        (b)(ii) a reservoir of oil disposed in the oil reservoir portion of the hydraulic pump body;
        (b)(iii) a piston disposed in the cylinder portion of the pump body to push oil from the reservoir of oil to said diaphragm chamber, and to pull oil from said diaphragm chamber back to said hydraulic pump; and
        (b)(iv) a make up oil line to allow oil to pass between the oil reservoir and the cylinder portion of the pump body.

2. The device of claim 1 wherein said overpressure relief valve is incorporated into the top of said piston head.

3. The device of claim 1, and further including a connecting rod to drive the hydraulic pump piston.

4. The device of claim 1 wherein said make up oil line includes a first end and a second end, said first end terminating in said reservoir of oil and said second end terminating in the cylinder portion of said pump body at a position below the piston when said piston is at its maximum height.

5. A method of pumping an absorbent solution from the low pressure side of an absorption heat exchange system to the high pressure side of an absorption heat exchange system,
    wherein the heat exchange system includes an absorbent fluid pathway between the low pressure side and the high pressure side; said method comprising:
        (a) driving a piston-driven hydraulic pump to push oil into a diaphragm pump and to pull oil out of that same diaphragm pump, and thereby to reciprocally move a diaphragm in said diaphragm pump; and
        (b) reciprocally moving said reciprocally moving diaphragm in said diaphragm pump to pull absorbent solution from the low pressure side of the heat exchange system and subsequently to push said absorbent solution to the high pressure side of the heat exchange system.

* * * * *